Nov. 21, 1950   A. H. HERMANN   2,530,880
CONTROL FOR CUTTING MACHINES
Filed Sept. 23, 1949   2 Sheets-Sheet 1
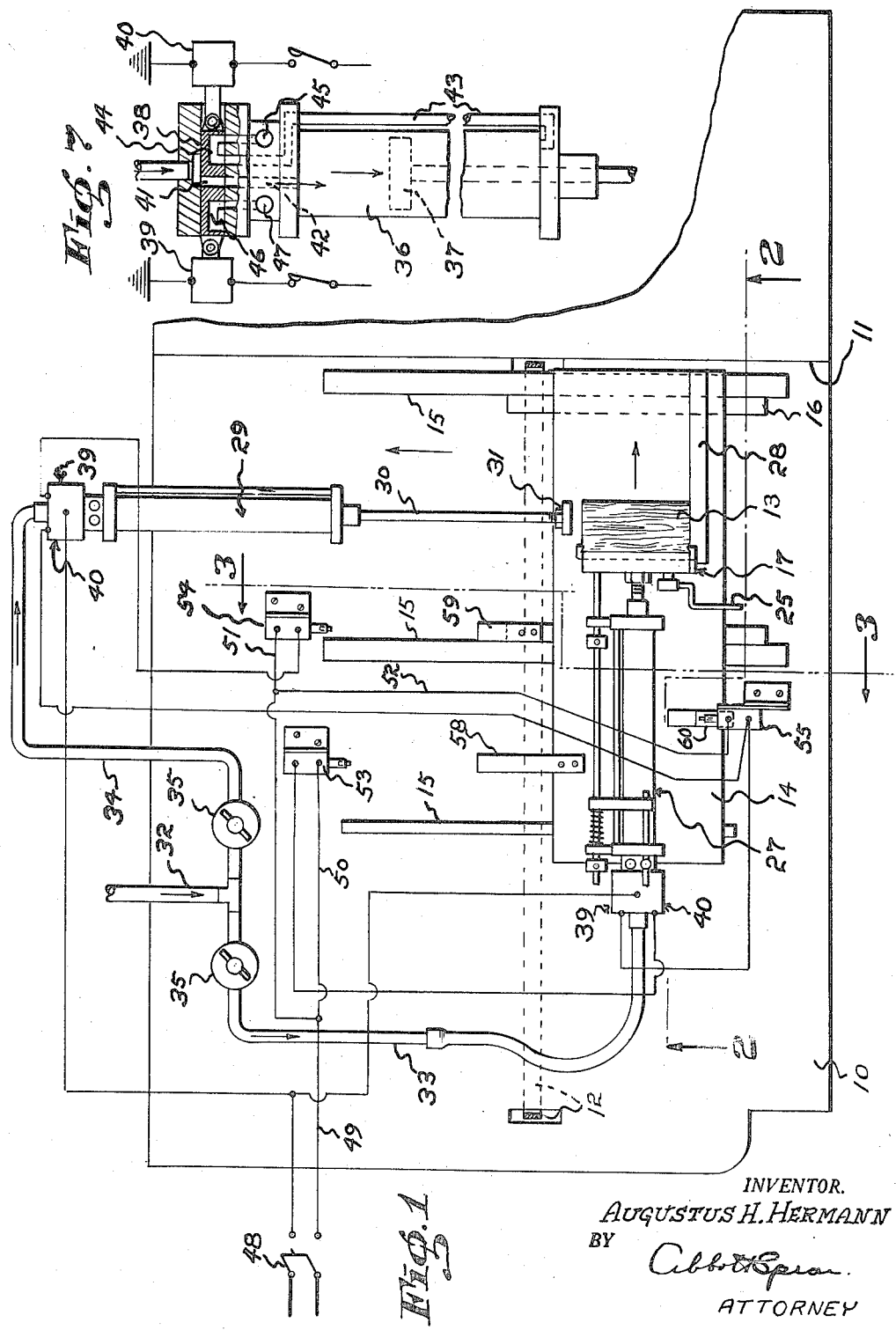
INVENTOR.
AUGUSTUS H. HERMANN
BY
Abbott & Spear
ATTORNEY Nov. 21, 1950   A. H. HERMANN   2,530,880
CONTROL FOR CUTTING MACHINES
Filed Sept. 23, 1949   2 Sheets-Sheet 2
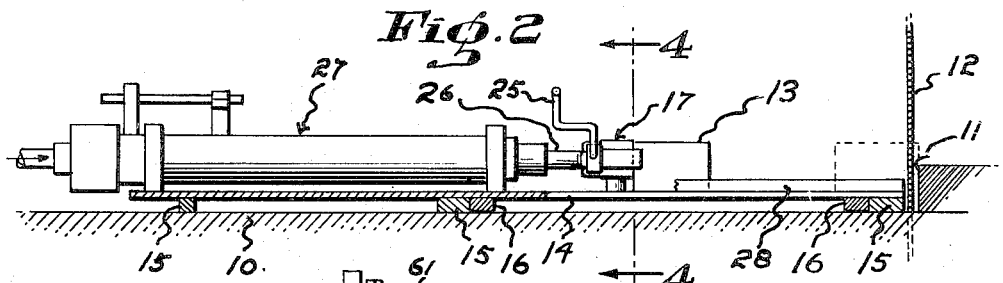
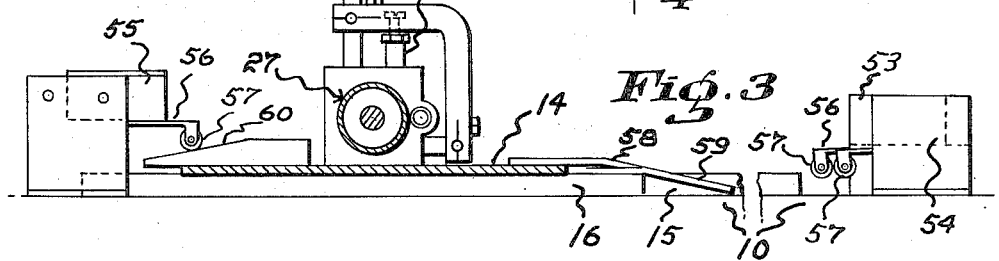
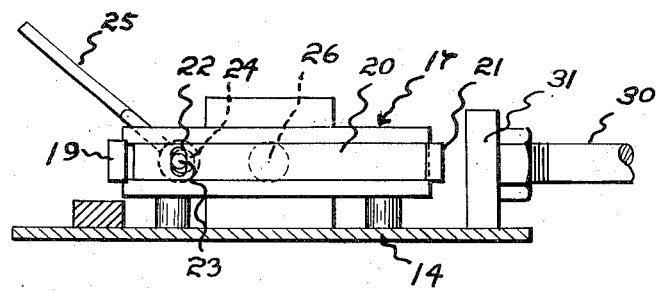
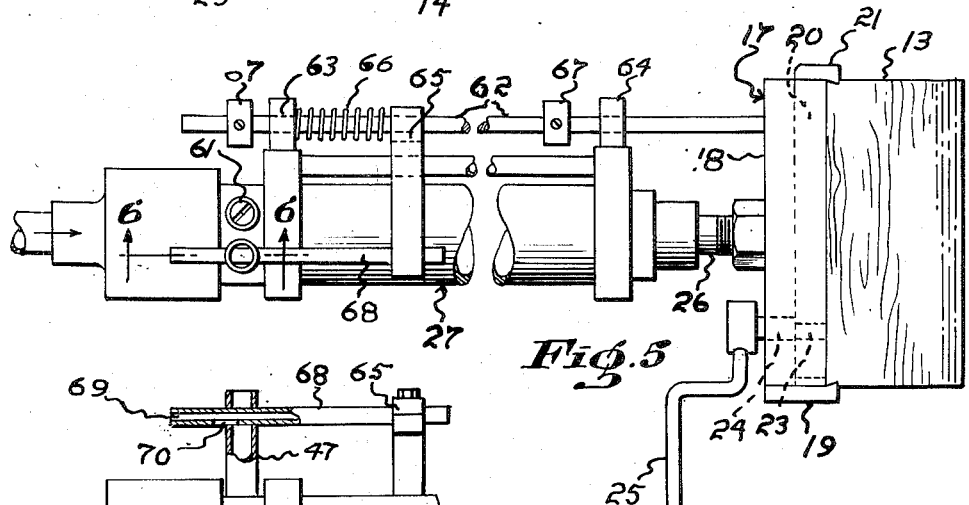
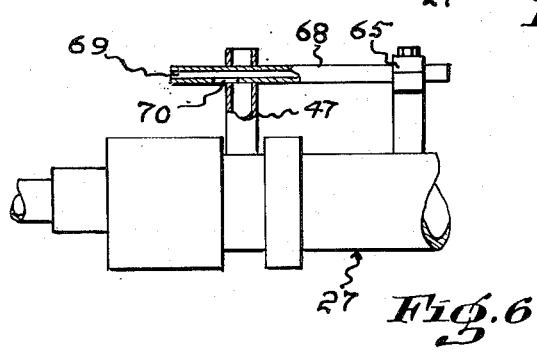
INVENTOR.
AUGUSTUS H. HERMANN
BY
ATTORNEY

Patented Nov. 21, 1950

2,530,880

UNITED STATES PATENT OFFICE 2,530,880

CONTROL FOR CUTTING MACHINES

Augustus H. Hermann, Melrose, Mass., assignor to Samuel Cabot, Inc., Boston, Mass., a corporation of Massachusetts Application September 23, 1949, Serial No. 117,344

5 Claims. (Cl. 143—25)

My present invention relates to an automatic control for a machine having a table, a shoulder, and a cutting element spaced from the shoulder so that a slab of predetermined thickness can be sliced from work pressed against the shoulder and slid against the cutting element.

While such machines may be used in slabbing a wide range of objects, they are widely used in cutting blocks of wood into so-called paint color sticks and it is in connection with the production of these sticks that I have discussed my invention. The manual operation of repeatedly pressing a block of wood against the shoulder of a saw table, advancing it therealong against the band saw and pulling the block back about the saw is monotonous and dangerous. In addition, the hand control of the block is not entirely satisfactory because the operator commonly moves the block, particularly when a cut is nearly completed, subjecting the saw blade to a strain that shortens its life and resulting in the slab being tapered to make it difficult to run through a stamping machine. The objects of this invention are to provide means for doing that job automatically to free employees from the risk and monotony that the slabbing task entailed, to produce the color sticks more efficiently and economically, and to ensure maximum life of the saw blades.

In accordance with my invention, I provide a slide movable on the saw table in parallel with its shoulder between a first position and a second position. A block holding clamp is supported by means on that slide to reciprocate between a first position spaced a substantial distance from the shoulder and second positions in which the clamped block is pressed against that shoulder and means on said table and connected to the slide to reciprocate it between its first and second positions to cause the saw to sever the block to produce a paint color stick.

The means employed, in the preferred embodiment of my invention, to reciprocate the slide are substantially identical to those employed to reciprocate the block holding clamp. Each is air operated and includes a cylinder, a piston and a valve control having a first position in which air is delivered to one side of the piston and vented from the other thereby to extend the piston relative to its cylinder and a second position in which the air delivery and air venting is reversed to retract the piston. Each control valve has a first solenoid which, when energized, establishes its first position and a second solenoid that establishes the second position thereof when it is energized. Means of this and similar types are commercially available.

A source of air is in communication with the valve control of each of the means and I employ a circuit including first, second and third normally open switches. The first of these controls a first lead including the first solenoid of the clamp reciprocating means and a second lead, in parallel therewith, to the second solenoid of the slide reciprocating means. The second switch controls a lead to the second solenoid of the clamp reciprocating means and the third switch controls a lead to the first solenoid of the slide reciprocating means.

I provide the slide with switch operating cams and these and the switches are so located relative to each other that when the slide is in its first position, the clamp is moved by its means to press the block against the bed shoulder and the slide is moved by its means to slide the thus positioned block against the saw blade. Before the slide reaches its second position, but after the cut has been completed, the second switch is closed thereby to start the withdrawal of the clamp in advance of the return of the slide which results when the third switch is closed thereby to ensure against contact with the saw of the block of wood held by the clamp. In addition, I provide for the relatively rapid movement of the clamp while providing cushions against shock and possible damage which the rapid strokes would otherwise develop.

My invention, therefore, makes possible the rapid slabbing of work without exposing workmen to risk of injury in an uninteresting job while ensuring safe and efficient operation and in the accompanying drawings, I have shown an illustrative embodiment of it from which these and other of its novel features and advantages will be apparent.

In the drawings:

Fig. 1 is a plan view of control apparatus in accordance with my invention showing the electric circuit diagrammatically.

Figs. 2 and 3 are fragmentary sections on an enlarged scale along the lines 2—2 and 3—3, respectively of Fig. 1.

Fig. 4 is a fragmentary section along the lines 4—4 of Fig. 2 but on an enlarged scale.

Fig. 5 is a plan view of the block holding clamp and its reciprocating means.

Fig. 6 is a fragmentary section along the lines 6—6 of Fig. 5, and

Fig. 7 is a schematic view of one of the reciprocating means.

I have indicated at 10 a saw table having a shoulder 11 gauging the thickness of the cut made by the band saw blade 12 when a block of wood 13 is slid against the blade 12 while in engagement with the shoulder 11.

In accordance with my invention, I provide a slide 14 and while this may otherwise be slidably mounted on the table 10, I have shown the table 10 as having a plurality of spaced slideways 15 in parallel with the shoulder 11 and the slide 14 as having a pair of ribs 16 engageable with the table 10 and confined between a pair of the slideways 15 to prevent movement of the slide towards or away from the shoulder 11.

The block of wood 13 is supported in a clamp, generally indicated at 17 and consisting, as may be most clearly seen in Figs. 4 and 5, of a main part 18 having a block engaging jaw 19 and channeled to slidably support the base 20 of the jaw 21. In order to move the jaw 21 into and out of block clamping relation relative to the jaw 19, the jaw base 20 is slotted as at 22 (see Fig. 4) to receive the pin 23 which is eccentric relative to the member 24 rotatably mounted in the main part 18 of the clamp 17 and having, on its exposed end, an operating handle 25 by which the member 24 may be rotated to cam the jaw 21 into and out of block clamping position.

The clamp 17 is mounted on the exposed end of the stem 26 of means generally indicated at 27 mounted on the slide 14 and adapted to reciprocate the clamp 17 between a first position remote from the shoulder 11 and a second position in which the block 13 is positioned against the shoulder 11. While the second position of the clamp 17 is dependent on the thickness of the block 13, in no case is it sufficiently close to the shoulder 11 to cause its engagement with the saw blade 12 as the slide 14 is reciprocated. I provide the slide 14 with a thrust shoulder 28 disposed at right angles to the shoulder 11 and with which one end of the block 13 is in engagement as the clamp 17 is reciprocated.

The slide 14 is itself reciprocated between first and second positions by means, generally indicated at 29, and which has a stem 30 connected as at 31 to the slide 14.

In practice, the means 27 and 29 are operated by air under pressure from any suitable source with the supply line being indicated at 32 in Fig. 1. The supply line 32 has a branch line 33 to the means 27 and a branch line 34 to the means 29. I provide each branch line with a pressure regulating valve 35 to enable the operating pressure to each of the means to be regulated as necessary to ensure the proper rate of reciprocation of the element controlled thereby.

The means 27 and 29 are commercially available units and while they may be of other types, they may be regarded as substantially identical as far as their general construction and mode of operation is concerned and for that reason, reference is made to Fig. 7 for the general nature of both the means 27 and 29. As schematically shown in Fig. 7, both means include a cylinder 36, a piston 37 to which the stem of that means is connected, and a valve control 38 which has first and second positions, the first of which is established when the electromagnet 39 is energized and the second of which is effected when the electromagnet 40 is energized.

In the first position of the valve control 38, its port 41 registers with the passage 42 to deliver air to one side of the piston 37 to advance it. In that position, the passageway 43, in communication with the opposite end of the cylinder 36, registers with the vent passage 44 in the control member 38 which is in communication with the vent 45 so that air is exhausted from that side of the piston 37.

In the second position of the valve control 38, the port 41 registers with the passageway 43 while the vent passage 44 is blocked so that air is delivered to the opposite end of the cylinder 36 to cause the return of the piston 37. The vent passage 46 is then in communication with the vent 47 to exhaust air on said return stroke.

To operate the means 27 and 29, I provide an electric circuit having a manually operated switch 48. The lead 49 of that circuit has parallel leads 50, 51, 52. The lead 50 includes a normally open switch 53 and the electromagnet 40 of the means 27, the lead 51 includes the normally open switch 54 and the electromagnet 39 of the means 29, and the lead 52 includes the normally open switch 55 and the electromagnet 39 of the means 27 and the parallel electromagnet 40 of the means 29. Each of the switches 53, 54, and 55 is conventional and may include, as shown in Fig. 3, an arm 56 yieldably held in a downward position and having a roller 57.

I provide the slide 14 with cams to control those switches to effect their closing in a desired manner. The slide 14 is shown as having cams 58, 59, and 60 and these are positioned relative to the switches 53, 54 and 55 respectively, so that when the slide is in its first position, as shown in Fig. 1, the switch 55 is closed by the cam 60. When the switch 55 is closed, the electromagnet 39 of the means 27 is energized and the valve control 38 is thereby positioned so that the air pressure is operative to cause the block 13 to be advanced against the shoulder 11. At the same time, the electromagnet 40 of the means 29 is energized to position the valve control of that means so that the air pressure is operative to draw the slide 14 towards the saw blade 12.

Such movement of the slide 14 causes the switch 55 to be opened by the cam 60, leaving the valve controls in the position above described. The switch 53 is closed by the cam 58 thereby to energize the electromagnet 40 of the means 27 to cause the return of the block 13 to a position remote from the shoulder 11. During this movement of the slide 14, the cam 59 closes the switch 54 to energize the electromagnet 39 of the means 29 to effect the return of the slide 14 to its first position on the opposite side of the blade 12.

It will be appreciated that it is essential that the operation of the means 27 and 29 be such as to ensure the seating of the block 13 against the shoulder 11 before the slide 14 has been moved into a position wherein the saw blade 12 is engaged. On the return of the slide, it is also essential that the block 13 be moved sufficiently away from the shoulder 11 to avoid contact with the saw blade 12. At the same time, maximum speed of operation is desired for efficient and economical production.

Movement of the block 13 relatively rapidly as compared to movement of the slide 14 is controlled by adjustments of the air pressure control valves 35 and I ensure against contact of the block 13 with the saw blade 12 on the return of the slide 14 by locating the switch 53 so that it is closed to start the return of the block 13 before the slide reaches its second position as determined by the switch 54.

Rapid movement of the block 13 between its first and second positions necessitates the protection against shock not only of the means 27 but also of the shoulder 11 for any misalinement of the shoulder 11 would defeat proper production.

For that reason, the venting of air in both directions of the travel of the piston of the means 27 is controlled. I accomplish this result, when the block 13 is advanced towards the shoulder 11, by providing the vent 45 with an adjustable valve 61 by which the rate of air escape is regulated to provide an air cushion as the block 13 nears the shoulder 11.

In order that the return stroke of the means 27 may be properly cushioned, I slidably support a rod 62 in mounts 63 and 64 as may be most clearly seen in Fig. 5. Fast on the rod 62 is an arm 65 and it and the rod 62 are urged towards the shoulder 11 by means of a spring 66 backed by the mount 63. Adjustable stops 67 on the rod 62 engageable with the mounts 63 and 64 limit its forward position so that it will be engaged and moved rearwardly a short distance by the clamp 17 as it returns to its first position. In practice (see Fig. 6), the arm 65 carries a member 68 having a bore 69 and a port 70 in communication therewith. The member 68 is slidable in the vent 47 and serves to close it. When the rod 62 is in its forward position, however, the port 70 is in the vent 47 so that air is free to escape ensuring rapid piston travel. As the clamp 17 approaches its first position, it engages and moves the rod 62 rearwardly so that the port 70 is no longer in communication with the vent 47 so that the vent 47 is suitably blocked to ensure the desired cushioning on the return stroke.

From the foregoing, it will be apparent that my control is simple in construction and reliable and efficient in operation. While the block 13 is moved rapidly into and out of engagement with the shoulder 11 as the slide 14 is moved from its first to its second position, its stroke is properly cushioned enabling high speed production to be maintained without risk of injury to operator and equipment and ensuring quality of product.

What I therefore claim and desire to secure by Letters Patent is:

1. A control for a machine having a table, a shoulder, and a cutting element spaced from the shoulder for uniformly slabbing blocks of wood held against the shoulder and slid against the cutting element, said control comprising a slide movable on said table in parallel with said shoulder between first and second positions, a block holding clamp, first means on said slide in support of said clamp to reciprocate it between a first position in which it is spaced from said shoulder and a second position in which said block is pressed against said shoulder, second means on said table and connected to said slide to reciprocate it between its first and second positions, each of said means including a cylinder, a piston, a valve control having a first position in which air is delivered to one side of said piston and a second position in which air is delivered to the other side thereof, first and second solenoids for each valve control to establish, when energized, said first and second positions respectively, a source of air in communication with the valve control of each of said means, and an electric circuit including first, second, and third normally open switches on said bed, each of which includes an arm, first, second and third cams carried by said slide, parallel leads from said first switch to the first solenoid of the first means and to the second solenoid of the second means, a lead from said second switch to the second solenoid of said first means, and a lead from the third switch to the first solenoid of the second means, said cams and switch being located so that said first switch is closed by said first cam in the first position of said slide and said second and third switches are closed by said second and third cams in the second position of said slide.

2. A control for a machine having a table, a shoulder, and a cutting element spaced from the shoulder for uniformly slabbing blocks of wood held against the shoulder and slid against the cutting element, said control comprising a slide movable on said table in parallel with said shoulder between first and second positions, a block holding clamp, first means on said slide in support of said clamp to reciprocate it relatively rapidly between a first position in which it is spaced from said shoulder and a second position in which said block is pressed against said shoulder, second means on said table and connected to said slide to reciprocate it relatively slowly between its first and second positions, each of said means including a cylinder, a piston, a valve control having a first position in which air is delivered to one side of said piston and a second position in which air is delivered to the other side thereof, first and second solenoids for each valve control to establish, when energized, said first and second positions respectively, a source of air in communication with the valve control of each of said means, and an electric circuit including first, second, and third normally open switches on said bed, each of which includes an arm, first, second and third cams carried by said slide, a lead from said first switch to the first solenoid of the first named means and the second solenoid of the second named means, a lead from said second switch to the second solenoid of said first means, and a lead from the third switch to the first solenoid of the second means, said cams and switch being located so that said first switch is closed by said first cam in the first position of said slide, said third switch is closed by said third cam in the second position of said slide, and said second switch is closed by said second cam in advance of said third switch to initiate movement of said clamp towards its first position before said slide reaches its second position.

3. A control for a machine having a table, a shoulder, and a cutting element spaced from the shoulder for uniformly slabbing blocks of wood held against the shoulder and slid against the cutting element, said control comprising a slide movable on said table in parallel with said shoulder between first and second positions, a block holding clamp, first means on said slide in support of said clamp to reciprocate it relatively rapidly between a first position in which it is spaced from said shoulder and a second position in which said block is pressed against said shoulder, second means on said table and connected to said slide to reciprocate it relatively slowly between its first and second positions, each of said means including a cylinder, a piston, a valve control having a first position in which air is delivered to one side and vented from the other side of said piston and a second position in which air is delivered to the other side and vented from the first named side thereof, first and second solenoids for each valve control to establish, when energized, said first and second positions respectively, a source of air in communication with the valve control of each of said means, and an electric circuit including first, second, and third normally open switches on said bed, each of which includes an arm, first, second and third cams carried by said slide, a lead from said first switch to the first solenoid of the first named means and the second solenoid of the second named means, a lead from said second switch to the second solenoid of said first means, and a lead from the third switch to the first solenoid of the second means, said cams and switch being located so that said first switch is closed by said first cam in the first position of said slide, said third switch is closed in the second position of said slide, and said second switch is closed by said second cam to initiate movement of said clamp towards its first position before said slide reaches its second position, and means in control of the air vented from either side of the piston of said first means to create an air cushion therefor substantially at the end of its stroke in either direction.

4. The control of claim 3 in which the means in control of the venting when the clamp moves towards its second position comprises an adjustable venting valve restricting the escape of air thereby to cause the air cushion to be developed in the course of piston movement.

5. The control of claim 3 in which the means in control of the venting when the clamp moves towards its first position, comprises a slidable valve member, slidably mounted on the cylinder and yieldably maintained in a first position with an end exposed to be engaged by the clamp as it approaches its first position, the valve being connected to the member to move therewith and blocking the flow of vented air only when the member has been moved away from its first position.

AUGUSTUS H. HERMANN.

No references cited.